United States Patent [19]

Okamura et al.

[11] 4,227,622
[45] Oct. 14, 1980

[54] TAPE CASSETTE

[75] Inventors: Masatoshi Okamura; Haruo Shiba; Kimio Tanaka, all of Tokyo, Japan

[73] Assignee: TDK Electronics Company, Limited, Tokyo, Japan

[21] Appl. No.: 41,880

[22] Filed: May 23, 1979

[30] Foreign Application Priority Data

Jul. 4, 1978 [JP] Japan .............................. 53/92194[U]

[51] Int. Cl.³ ...................... G11B 23/06; B65H 17/48; B65D 6/32
[52] U.S. Cl. .................................. 220/4 B; 220/327; 242/55.19 A; 242/197
[58] Field of Search .............. 220/4 R, 4 B, 4 E, 327; 206/387; 242/55.19 A, 197

[56] References Cited

U.S. PATENT DOCUMENTS

| | | | |
|---|---|---|---|
| 2,863,332 | 12/1958 | Maynard | 220/4 B |
| 2,930,834 | 3/1960 | Hose | 220/4 R |
| 3,420,463 | 1/1969 | Cousino | 242/55.19 A |
| 3,951,352 | 4/1976 | Kalmokoff | 242/55.19 A |

FOREIGN PATENT DOCUMENTS 1571233  6/1969  France ....................................... 220/327

*Primary Examiner*—George E. Lowrance
*Attorney, Agent, or Firm*—Oblon, Fisher, Spivak, McClelland & Maier

[57] ABSTRACT

A tape cassette comprises an upper half casing and a lower half casing and male hollow cylindrical projections having a notch mounted on either of the upper half casing or the lower half casing and female hollow recesses mounted on the other half casing at the corresponding positions. The upper and lower half casings are superposed to fit the male hollow cylindrical projects into the corresponding female hollow recesses and are fixed together by screwing self-tap bolts from the female hollow recesses into the male hollow cylindrical projections having notches to fix the projections on the inner surfaces of the female hollow recesses.

6 Claims, 4 Drawing Figures

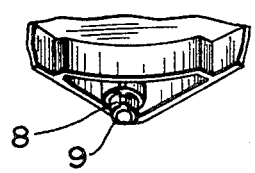
FIG. 2
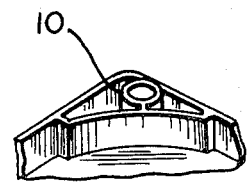
FIG. 3
FIG. 4
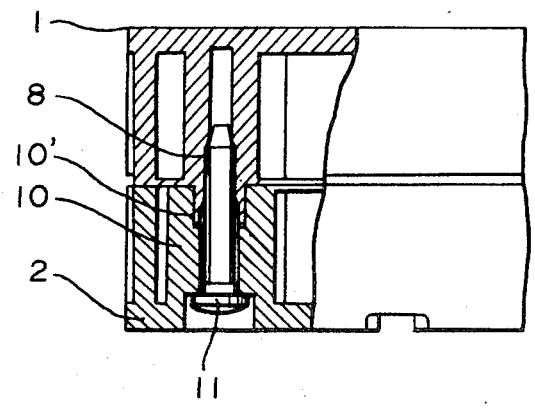

TAPE CASSETTE

BACKGROUND OF THE INVENTION

1. FIELD OF THE INVENTION

The present invention relates to a tape cassette. More particularly, it relates to a tape cassette wherein an upper half casing and a lower half casing are assembled without any slip-out.

2. DESCRIPTION OF THE PRIOR ART

A tape cassette used for VTR etc. usually comprises an upper half casing (1) and a lower half casing (2) as shown in FIG. 1. In the assembly of the tape cassette, cylindrical projections $(5'_1)$, $(5'_2)$ mounted on the lower half casing (2) are respectively arranged on cylindrical projections $(5''_1)$, $(5''_2)$ mounted on the upper half casing (1) by superposing the upper half casing (1) to the lower half casing (2). The casings (1), (2) are fixed by screwing screw bolts $(3_3)$, $(3_5)$ after inserting the screw bolts from the cylindrical projections $(5'_1)$, $(5'_2)$ into the cylindrical projections $(5''_1)$, $(5''_2)$, respectively. Screw bolts $(3_1)$, $(3_2)$, $(3_4)$ are also inserted from the lower half casing (2) and screwed in the corresponding cylindrical projections mounted on the upper half casing (1). A lock plate (6) for a cover (not shown) and a spring (7) for the lock plate are fitted.

In prior art tape cassettes having the aforementioned structure, there is a possibility of disadvantageous failure for slipping off the uppper half casing (1) from the lower half casing (2) in the step transferring the superposed upper and lower half casings to the next screwing step in the assembly.

SUMMMARY OF THE INVENTION

It is an object of the present invention to provide a tape cassette which can be easily assembled without slipping off an upper half casing from a lower half casing.

It is another object of the present invention to provide a tape cassette which is firmly assembled.

The foregoing and other objects of the present invention have been attained by providing a stage cassette comprising an upper half casing and a lower half casing wherein male hollow cylindrical projections having a notch are mounted on either of the upper half casing or the lower half casing and female hollow recesses corresponding to the male hollow cylindrical projections are mounted on the other half casing, and superposed upper and lower half casings are fixed by screwing self-tap bolts from the female hollow recesses into the slotted male hollow cylindrical projections to fix the projections on the inner surfaces of the female hollow recesses.

BRIEF DESCRIPTION OF THE DRAWINGS

FIGS. 2 and 3 are schematic views of enlarged important parts to the tape cassette of the present invention; and FIG. 4 is a partially sectional view of the important part of the tape cassette of the present invention.

Figure 1:
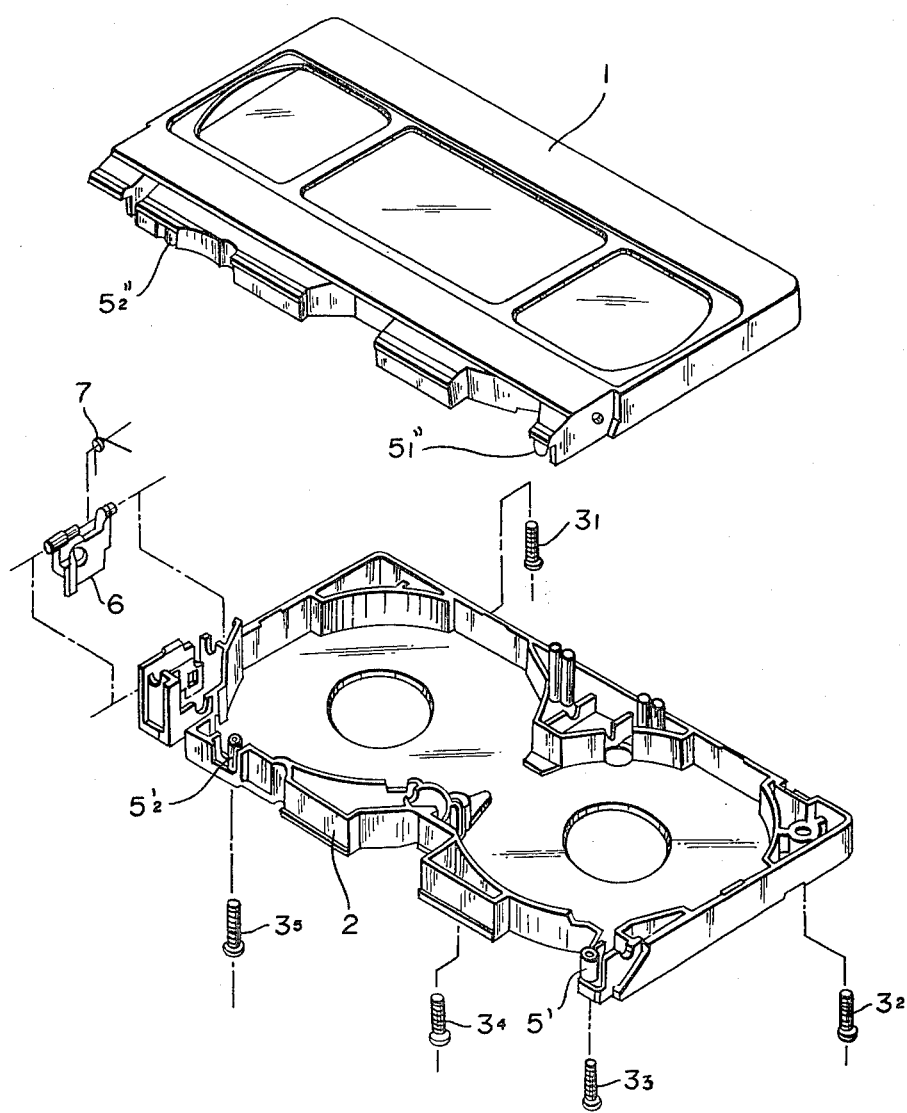
FIG. 1 is a schematic, exploded perspective view of half casings of a prior art tape cassette.

DETAILED DESCRIPTION OF THE PREFERRED EMBODIMENTS:

Referring to the drawings, the tape cassette of the present invention will be illustrated.

FIG. 2 shows the male hollow cylindrical projection (8) of the upper half casing (1). The male hollow cylindrical projection (8) has a notch (9). Te projection (8) corresponds to the prior art cylindrical projection $(5''_1)$, $(5''_2)$.

FIG. 3 shows the female hollow recess (10) which corresponds to the prior art cylindrical projection $(5'_1)$, $(5'_2)$.

The upper half casing (1) having the male hollow cylindrical projections (8) is superposed to the lower half casing (2) having the female cylindrical recesses (10) whereby the male hollow cylindrical projections (8) are fitted to the female hollow recesses (10) as shown in FIG. 4. The self-tap bolts (11) are inserted from the female hollow recesses (10) and are screwed into the male hollow cylindrical projections (8) having the notch (9). The male hollow cylindrical projections (8) are outwardly enlarged by the pressure of the self-tap bolts (11) since the notches (9) are formed on the projections (8). Therefore, the enlarged outer surfaces of the projections (8) are contacted with the inner surfaces of the female hollow recesses (10) to be firmly fixed.

It has been known to fit cylindrical projections having a notch into the corresponding hollow recesses for purpose of a fitting the upper and lower half casings. However, this is only for fitting by inserting the cylindrical projects into the hollow recesses without bolts. The function is only fitting of the upper and lower half casings without fixing them with bolts.

On the other hand, in accordance with the present invention, the self-tap bolts are forcibly screwed into the male hollow cylindrical projections (8) having notch (9) to enlarge the projections in the radial direction and to provide strong force in the radial direction. When the self-tap bolts are respectively screwed into the hollows of the male hollow cylindrical projections (8) having notch (9), the outer surfaces of the projections (8) are radially enlarged because of the notch. The radially enlarged outer surfaces of the projections (8) are firmly fixed on the inner surfaces of the corresponding hollows of the female hollow recesses (10).

In accordance with the present invention, the pre-setting of the upper and lower half casings is attained and then, the firm fixing of the upper and lower half casings is also attained by screwing the self-tap bolts. The assembly of the upper and lower half casings is given by strong force without any loosening.

What is claimed is:

1. In a tape cassette comprising an upper half casing and a lower half casing which are assembled with bolts, an improvement characterized in that longitudinally slotted male hollow cylindrical projections are mounted on either of the upper half casing or the lower half casing and female hollow recesses are mounted on the other half casing at the corresponding positions and the upper and lower half casings are superposed to fit the male hollow cylindrical projections into the corresponding female hollow recesses, and self-tap bolts are screwed from the female hollow recesses into the slotted male hollow cylindrical projections to radially expand the male hollow cylindrical projections to fit the projections on the inner surfaces of the female hollow recesses, radial expansion of the male hollow cylindrical projections being facilitated by being slotted.

2. A tape cassette according to claim 1 wherein the male hollow cylindrical projection has a hollow bottom part.

3. A tape cassette according to claim 1 wherein the male hollow cylindrical projection has one or more slots in the axial direction.

4. A tape cassette according to claim 1 wherein the male hollow cylindrical projection is formed in one piece with the half casing by a molding or a casting.

5. A tape cassette according to claim 1 wherein the female hollow recess has a hole for inserting the self-tap bolt and a wider hollow for receiving the male hollow cylindrical projection.

6. A tape cassette according to claim 1 wherein the female hollow recess is formed in one piece with the half casing by a molding or a casting.

* * * * *